United States Patent [19]

Kawamura et al.

[11] Patent Number: 4,638,052
[45] Date of Patent: Jan. 20, 1987

[54] AZO-PIGMENT CONTAINING HYDROXY NAPHTHOIC ACID AMIDE AND AN IMINOOXOISOINDOLENINE COMPONENTS

[75] Inventors: Kimihide Kawamura, Koshigaya; Shojiro Horiguchi, Omiya; Hisao Okamoto, Washinomiya, all of Japan

[73] Assignee: Dainichiseika Color & Chemicals Mfg. Co., Ltd., Tokyo, Japan

[21] Appl. No.: 686,900

[22] Filed: Dec. 27, 1984

[30] Foreign Application Priority Data

| | | | |
|---|---|---|---|
| Jan. 17, 1984 | [JP] | Japan | 59-4775 |
| Jun. 18, 1984 | [JP] | Japan | 59-123627 |
| Jun. 18, 1984 | [JP] | Japan | 59-123628 |
| Jun. 18, 1984 | [JP] | Japan | 59-123629 |

[51] Int. Cl.$^4$ .................. C09B 29/036; C09B 29/20; C09B 29/22; C09B 67/20
[52] U.S. Cl. .................. 534/575; 534/588; 534/591; 534/598; 534/738; 534/774; 534/775; 534/776
[58] Field of Search .............. 534/776, 575, 738, 775, 534/774

[56] References Cited

U.S. PATENT DOCUMENTS

| | | | |
|---|---|---|---|
| 3,781,266 | 12/1973 | Dietz et al. | 534/575 X |
| 3,867,404 | 2/1975 | Vor Der Crone et al. | 534/738 X |
| 3,928,315 | 12/1975 | Ribka | 534/575 |
| 3,985,725 | 10/1976 | Ribka et al. | 534/575 X |
| 4,220,586 | 9/1980 | Cseh et al. | 534/575 X |
| 4,221,709 | 9/1980 | Kawamura et al. | 534/776 X |
| 4,229,344 | 10/1980 | Muller et al. | 534/575 X |
| 4,371,467 | 2/1983 | Ando et al. | 534/738 X |

FOREIGN PATENT DOCUMENTS

| | | | |
|---|---|---|---|
| 2701315 | 1/1978 | Fed. Rep. of Germany | 534/738 |
| 56-49757 | 5/1981 | Japan | 534/738 |
| 72-17824 | 7/1973 | Netherlands | 534/575 |

OTHER PUBLICATIONS

Biedermann, J. Soc. Dyers Colourists, vol. 87, pp. 105 to 111 (1971).

*Primary Examiner*—Floyd D. Higel
*Attorney, Agent, or Firm*—Oblon, Fisher, Spivak, McClelland & Maier

[57] ABSTRACT

An azo-pigment represented by the general formula:

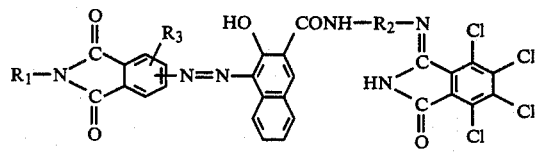

where $R_1$ is a hydrogen atom, a $C_1$–$C_4$ alkyl group, an unsubstituted phenyl group or a substituted phenyl group, $R_2$ is a residue of a phenylenediamine, and $R_3$ is a hydrogen atom, a methyl group, a methoxy group or a halogen atom. The azo-pigment of the present invention is useful in applications where azo-pigments are used.

4 Claims, 7 Drawing Figures

AZO-PIGMENT CONTAINING HYDROXY NAPHTHOIC ACID AMIDE AND AN IMINOOXOISOINDOLENINE COMPONENTS

The present invention relates to novel azo-pigments having excellent light resistance, solvent resistance, heat resistance and coloring power, and processes for their preparation.

Heretofore, numerous azo-pigments have been known and widely used. However, none of the conventional azo-pigments are fully satisfactory in their properties.

As a result of extensive researches on various azo-pigments to improve their stabilities, particularly weather resistance and solvent resistance, it has now been found that the azo-pigments represented by the following formula I are superior in various properties. The present invention is based on this discovery.

Namely, the present invention provides a novel azo-pigment represented by the general formula:

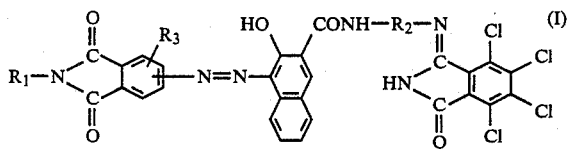

where $R_1$ is a hydrogen atom, a $C_1$–$C_4$ alkyl group, an unsubstituted phenyl group or a substituted phenyl group, $R_2$ is a residue of a phenylenediamine, and $R_3$ is a hydrogen atom, a methyl group, a methoxy group or a halogen atom.

The present invention also provides a process for preparing the azo-pigment of the formula I, which comprises:

(a) reacting a compound represented by the general formula:

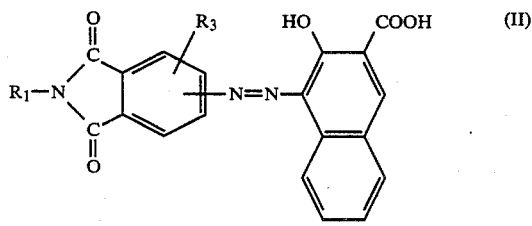

where $R_1$ and $R_3$ are as defined above, with a compound represented by the general formula:

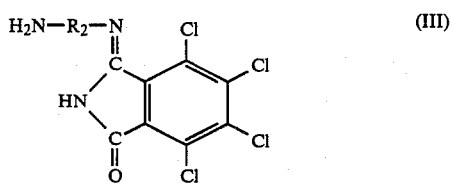

where $R_2$ is as defined above;

(b) reacting a compound represented by the general formula:

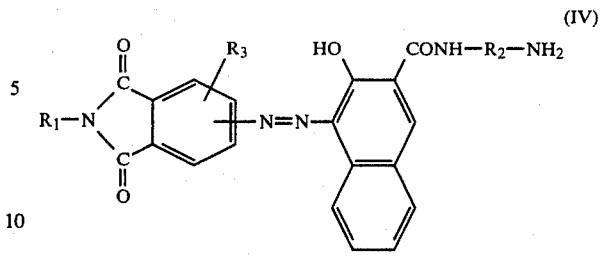

where $R_1$, $R_2$ and $R_3$ are as defined above, with a compound represented by the general formula:

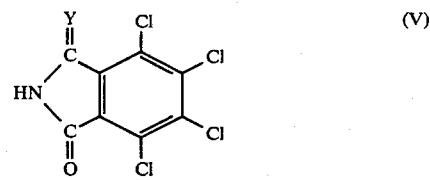

where Y is $Cl_2$, $(OCH_3)_2$ or NH; or (c) coupling a diazonium compound of 3- or 4-aminophthalimide or its derivative, with a compound represented by the general formula:

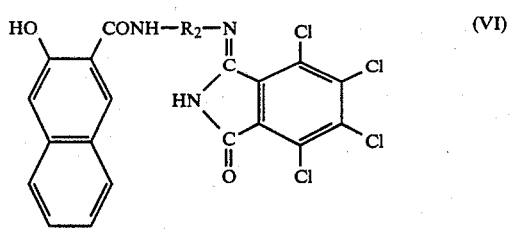

where $R_2$ is as defined above.

Now, the present invention will be described in detail with reference to the preferred embodiments.

In the accompanying drawings.

Figure 7:
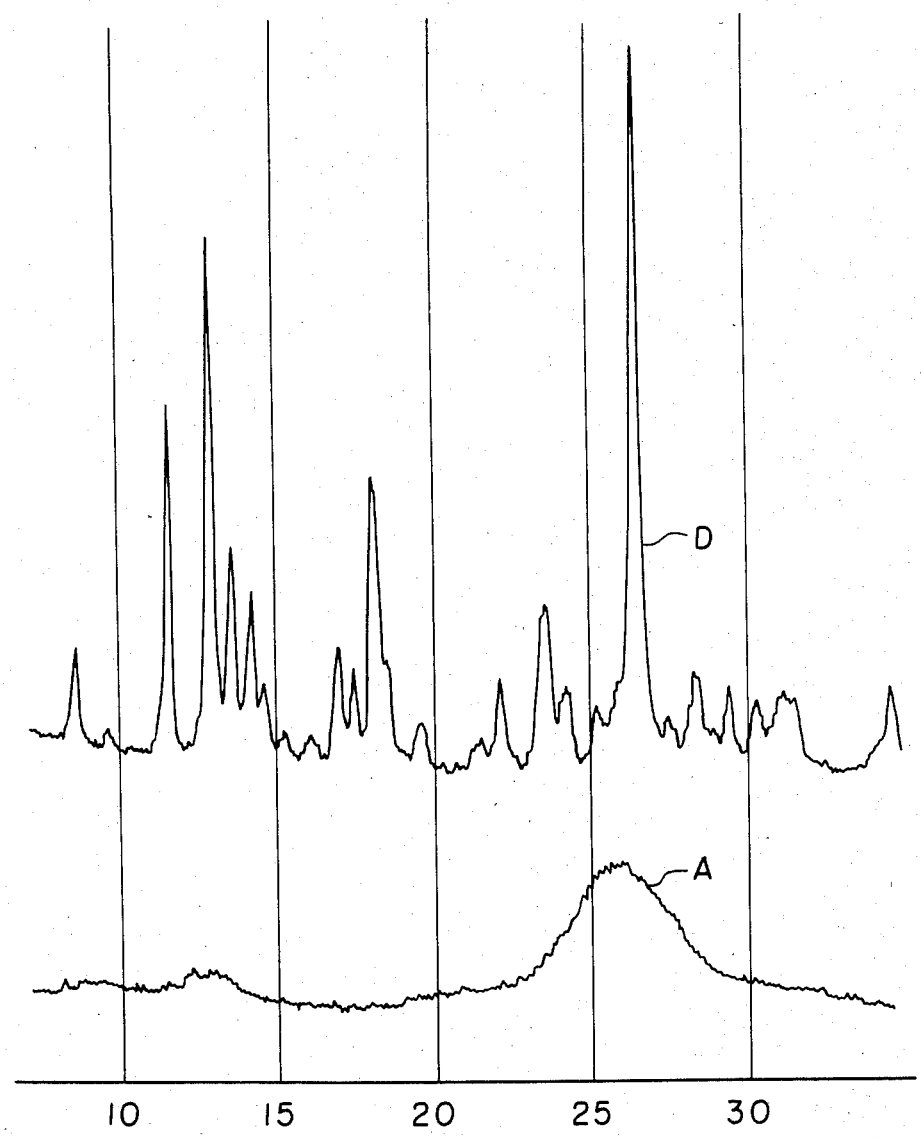

FIG. 7 likewise shows X-ray diffraction patterns of the azo-pigments of Example 1(A) and Example 67(D).

As mentioned above, the azo-pigments of the present invention may be prepared by the following three methods.

(a) A method wherein the compound of the formula II prepared by coupling a diazonium compound of 3- or 4-aminophthalimide or its derivative with 2-hydro-3-naphthoic acid or a functional derivative thereof, is reacted with the compound of the formula III.

The compound of the formula III is per se known, and those disclosed in e.g. Japanese Examined Patent Publication No. 2102/1981 may be employed.

The reaction of the compound of the formula II with the compound of the formula III may readily be conducted in accordance with a conventional method by reacting the two compounds in an inert solvent such as benzene, chlorobenzene, an alkyl benzene, nitrobenzene or the like, preferably by means of e.g. a halogenating agent such as thionyl chloride, phosphorus pentachloride or phosphorus oxychloride, whereby the azo-pigment of the formula I of the present invention is obtainable.

(b) A method wherein the compound of the formula IV is reacted with the compound of the formula V.

The compound of the formula IV is obtainable by reacting the compound of the formula II or a functional derivative thereof, with nitroaniline which may have a substitutent, and then reducing the nitro group to an amino group.

The compound of the formula V is a nucleus-halogenated derivative of 3-imino-1-oxoisoindoline, 3,3-dimethoxy-1-oxoisoindoline or 3,3-dichloro-1-oxoisoindoline.

The reaction of the compound of the formula IV with the compound of the formula V, may be conducted in accordance with a conventional method, whereby the azo-pigment of the formula I of the present invention is obtainable.

(c) A method wherein the compound of the formula VI as a coupling component, is reacted with 3- or 4-aminophthalimide or its derivative as a diazo component.

The compound of the formula VI is obtainable by reacting the compound of the formula III with 2-hydroxy-3-naphthoic acid in the same manner as in the above reaction (a).

The coupling reaction of the compound of the formula VI with a diazonium salt of 3- or 4-aminophthalimide or it derivative, can be conducted in accordance with a conventional method, whereby the azo-pigment of the formula I of the present invention is obtainable.

The azo-pigments of the present invention thus obtained, have extremely good solvent resistance, and they also have good light-resistance, heat-resistance, water-resistance, acid-resistance and alkali-resistance, and an extremely high coloring power. Thus, they are useful as azo-pigments.

Namely, for the solvent resistance test, 0.5 g of each azo-pigment of the present invention was put into a test tube, and 10 cc of a solvent such as methyl isobutyl ketone, methyl alcohol, toluene, acetone, cellosolve acetate, mineral spirit, butyl alcohol, ethyl acetate or trichlene was added. The mixture was shaken for a while and then left to stand still, whereby the supernatant was not substantially colored.

Further, for the heat-resistance tests, an azo-pigment of the present invention was kneaded with a vehicle to obtain a paste, and the paste was coated on a tin plate. The coated tin plate was treated at a temperature of 200° C. for 1 hour by means of an electric furnace, whereby no substantial color change was observed.

Further, from the tests for light-resistance, acid resistance, alkali-resistance and water-resistance, the compounds of the present invention were found to be adequately satsifactory as azo-pigments.

Among the azo-pigments of the present invention, an azo-pigment represented by the formula:

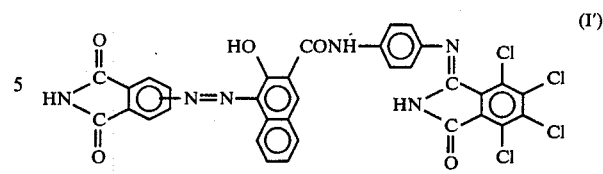

(I')

is particularly preferred.

The azo-pigment of the formula I' is prepared by:

(a) reacting a compound represented by the formula:

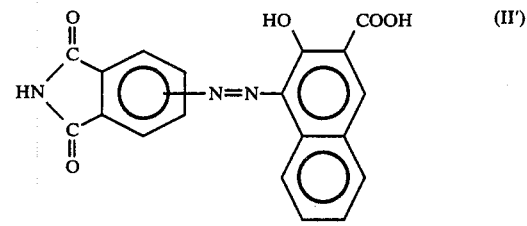

(II')

with a compound represented by the formula:

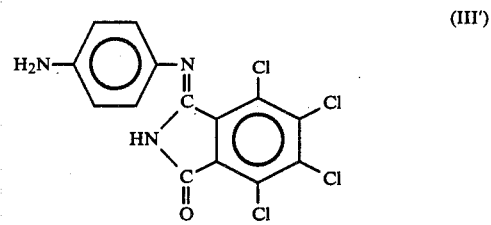

(III')

(b) reacting a compound represented by the formula:

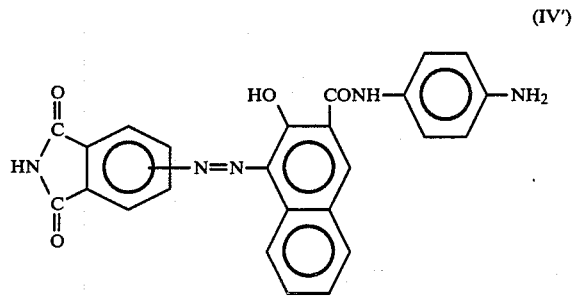

(IV')

with a compound represented by the formula:

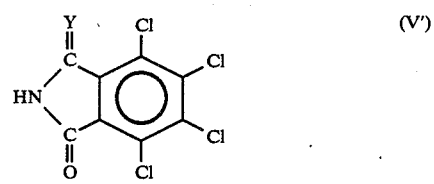

(V')

where Y is Cl$_2$, (OCH$_3$)$_2$ or NH; or (c) coupling a diazonium compound of 3- or 4-aminophthalimide with a compound represented by the formula:

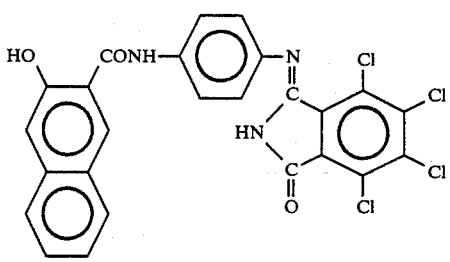

(VI')

Referring to the reaction (a), the compound of the formula II' is obtainable by coupling a diazonium compound of 3- or 4-aminophthalimide with 2-hydro-3-naphtoic acid. The compound of the formula III' is per se known, and for instance, the one disclosed in Japanese Examined Patent Publication No. 2101/1981 may be used.

The reaction of the compound of the formula II' with the compound of the formula III', can readily be conducted in accordance with a conventional method by reacting the two compounds in an inert solvent such as benzene, chlorobenzene, an alkyl benzene, nitrobenzene, α-chloronaphthalene, or the like, preferably by using a halogenating agent such as thionyl chloride, phosphorus pentachloride or phosphorus oxychloride, whereby an amorphous azo-pigment of the formula I' will be obtained.

Referring to the reaction (b), the compound of the formula IV' is obtainable by reacting the compound of the formula II' with nitroaniline, and then the nitro group is reduced to an amino group.

The compound of the formula V' is a nucleus-halogenated derivative of 3-imino-1-oxoisoindoline, 3,3-dimethoxy-1-oxoisoindoline or 3,3-dichloro-1-oxoisoindoline. The reaction of the compound of the formula IV' with the compound of the formula V' may be conducted in accordance with a conventional method, whereby an amorphous azo-pigment of the formula I' is obtainable.

Referring to the reaction (c), the compound of the formula VI' is obtainable by reacting the compound of the formula III' with 2-hydroxy-3-naphthoic acid in a manner similar to the above reaction (a). The coupling reaction of the diazonium salt of 3- or 4-aminophthalimide with the compound of the formula VI' may be conducted in accordance with a conventional method, whereby an amorphous azo-pigment of the formula I' is obtainable.

Figure 1:
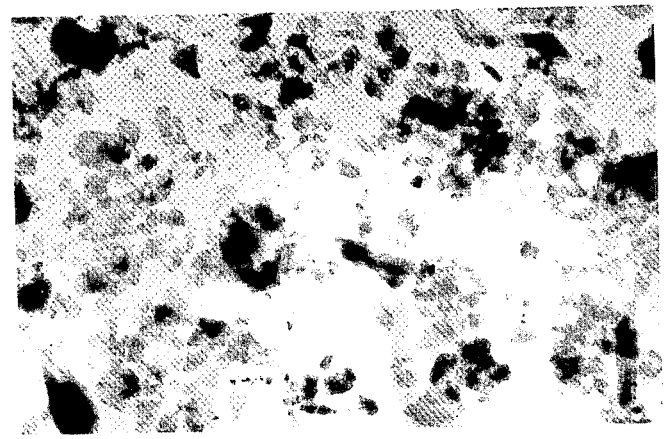
FIG. 1 is an electron microscopic photograph (×30,000) of the amorphous azo-pigment obtained in Example 1.
Figure 5:
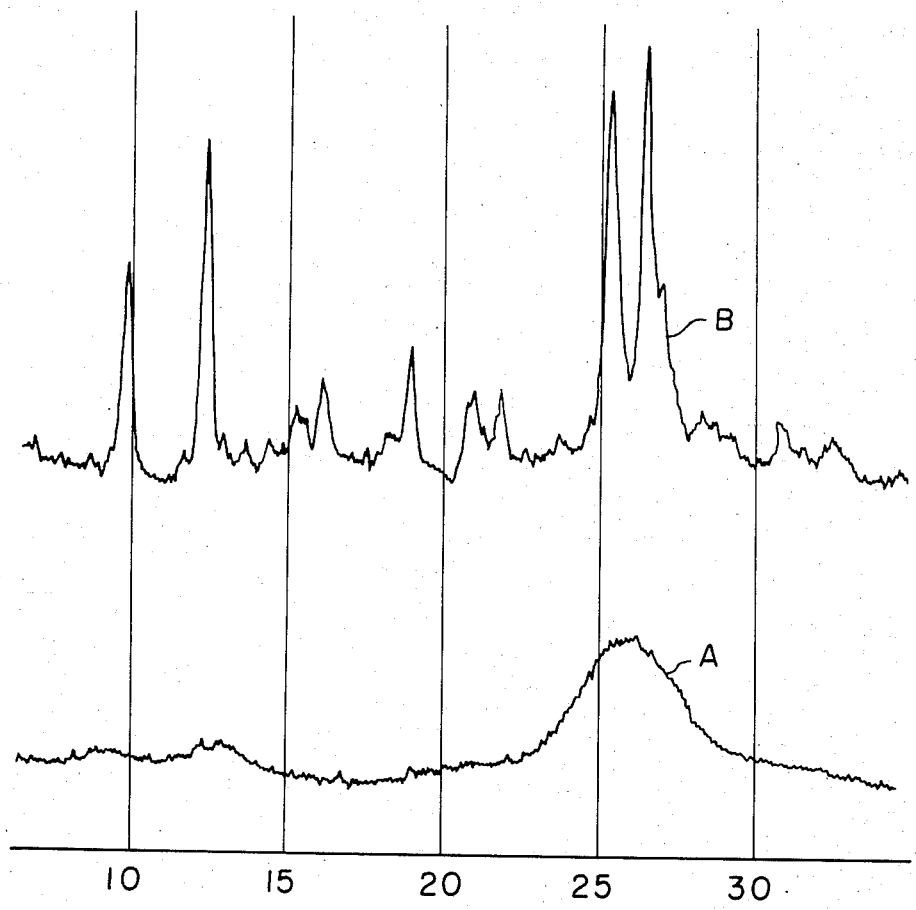
FIG. 5 shows X-ray diffraction patterns of the azo-pigments obtained in Example 1(A) and Example 63(B).
Figure 6:
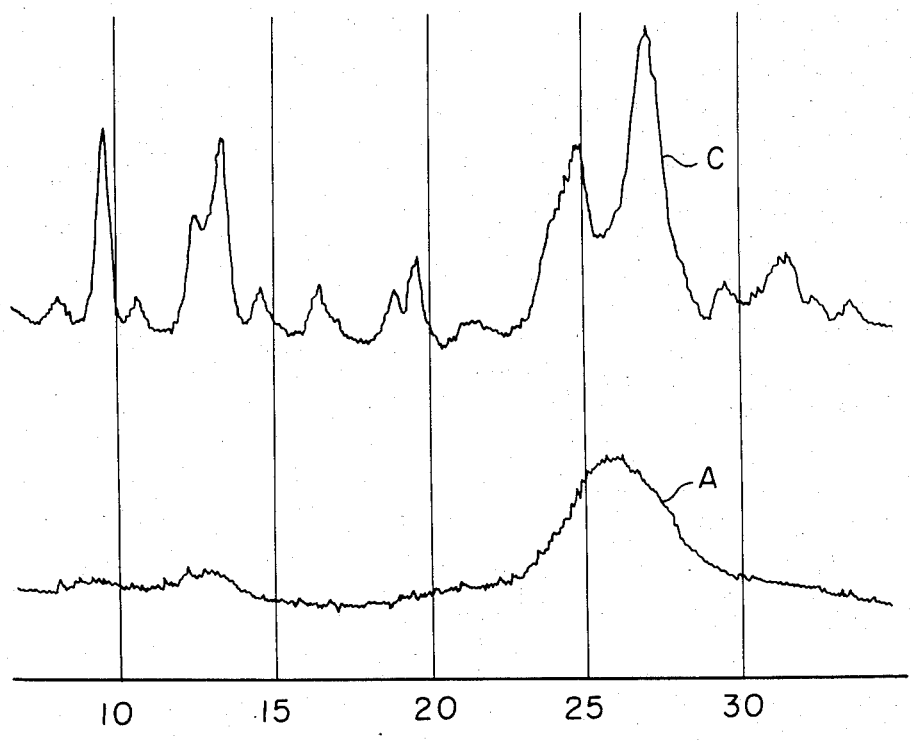
FIG. 6 shows X-ray diffraction patterns of the azo-pigments of Example 1(A) and Example 65(C).

As shown in FIG. 1 and by the X-ray diffraction pattern A in each of FIGS. 5 to 7, the amorphous azo-pigment thus obtained has no substantial crystalline property.

It has been found that a crystalline azo-pigment having a clear hue and improved solvent-resistance, light-resistance and heat-resistance is obtainable by heat-treating the amorphous azo-pigment of the formula I' at a temperature of from about 120° to about 250° C. in an organic solvent having a high boiling point, such as nitrobenzene, trichlorobenzene, orthodichlorobenzene or α-chloronaphthalene. The heat-treatment is usually conducted from about 1 to about 10 hours. Such a crystalline azo-pigment is also prepared by a method of crystal growth by means of crystal seeds.

Figure 2:
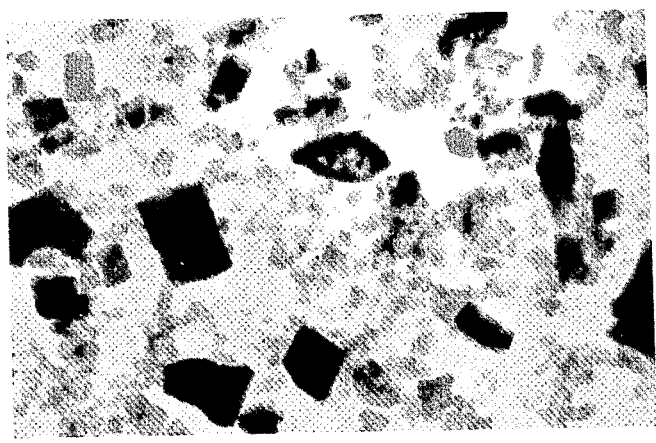
FIG. 2 is an electron microscopic photograph (×30,000) of the azo-pigment obtained in Example 63.

Namely, when the amorphous azo-pigment of the formula I' is heat-treated in nitrobenzene under the above-mentioned conditions, it will be converted to an azo-pigment of the formula I' which has a crystalline structure showing characteristic X-ray diffraction peaks at diffraction angles (2θ) of about 9.80°, about 12.4°, about 25.3° and about 26.5°, as shown in FIG. 2 and by the X-ray diffraction pattern B in FIG. 5.

Figure 3:
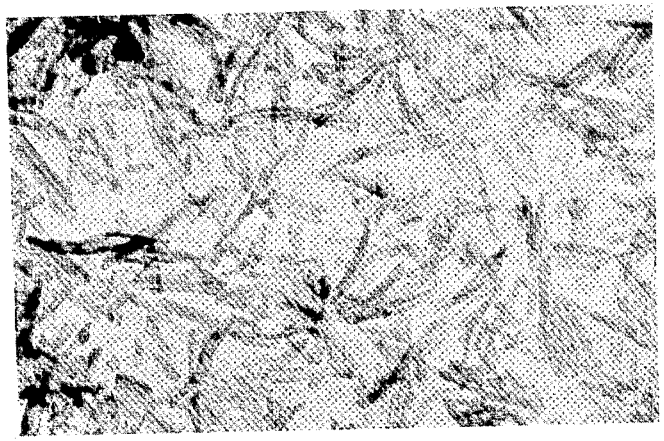
FIG. 3 is an electron microscopic photograph (×30,000) of the azo-pigment of Example 65.

Likewise, when heat-treated in butyl cellosolve or ethylene glycol under the above-mentioned conditions, the amorphous azo-pigment of the formula I' will be converted to a crystalline azo-pigment of the formula I' showing characteristic X-ray diffraction peaks at diffraction angles (2θ) of about 9.7°, about 13.5°, about 24.9° and about 27.0°, as shown in FIG. 3 and by the X-ray diffraction pattern C in FIG. 6.

Figure 4:
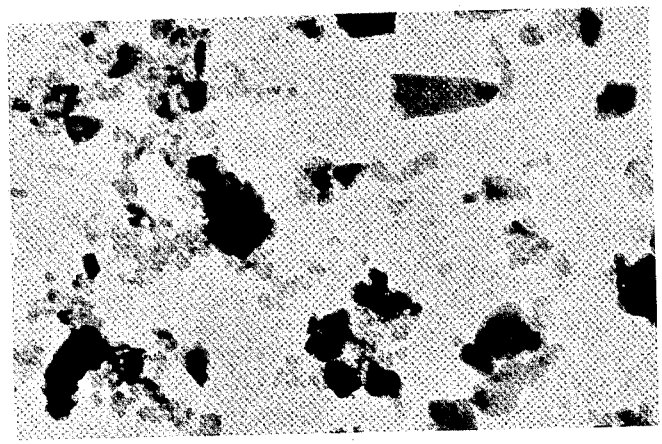
FIG. 4 is an electron microscopic photograph (×30,000) of the azo-pigment of Example 67.

Further, when likewise heat-treated in α-chloronaphthalene or trichlorobenzene, the amorphous azo-pigment of the formula I' will be converted to a crystalline azo-pigment of the formula I' showing characteristic X-ray diffraction peaks at diffraction angles (2θ) of about 8.6°, about 11.6°, about 12.9°, about 14.3°, about 18.1° and about 26.5°, as shown in FIG. 4 and by the X-ray diffraction pattern D in FIG. 7.

The X-ray diffraction patterns were measured under the following conditions:
Target: Cu
Scan Speed: 2 (2θ/min)
Filter: Ni
Chart Speed: 2 (2θ/min)
Voltage: 30 KV
Angle range: 5–40 (2θ)
Current: 15 mA
Viv Slit: 1 n
Full Scale: 2000 cps
Scat slit: 1 n
Time const: 2 sec
Rec Slict: 0.4 min The apparatus used for the measurement is DX-type X-ray diffraction apparatus manufactured by Nippon Denshi Kabushiki Kaisha.

Now, the present invention will be described in further detail with reference to Examples. However, it should be understood that the present invention is by no means restricted by these specific Examples.

In the Examples, "parts" means "parts by weight".

EXAMPLE 1

In a usual manner, 1.62 parts of 4-aminophthalimide was diazotized in dilute hydrochloric acid to obtain a diazonium salt solution. On the other hand, 5.5 parts of a compound of the formula VI where $R_2$ is a p-phenylene group was dissolved in a mixture comprising 100 parts of methanol, 2.0 parts of sodium hydroxide and 1 part of triethanolamine, to obtain a coupling component solution. The diazonium salt solution and the coupling component solution were mixed for about 30 minutes for a coupling reaction. Then, the mixture was heat-treated for 1 hour at a temperature of from 50° to 60° C., followed by filtration, washing with water and drying, whereby a brownish red pigment of the formula I where $R_1$ is a hydrogen atom and $R_2$ is a p-phenylene group, was obtained. This pigment had satisfactory properties such as good light-resistance, heat-resistance and solvent-resistance. An electron microscopic photograph of this pigment is shown in FIG. 1. The X-ray diffraction pattern of this pigment is shown by A in FIGS. 5 to 7.

EXAMPLE 2

In a usual manner, 2.7 parts of N-(4-chlorophenyl)-4-aminophthalimide was diazotized in dilute hydrochloric acid to obtain a diazonium salt solution. On the other hand, 2.8 parts of a compound of the formula VI where $R_2$ is a p-phenylene group, was dissolved in 200 parts of an aqueous solution containing 1.5% of sodium hydroxide, to obtain a coupling component solution. The diazonium salt solution and the coupling component solution were mixed for about 30 minutes for a coupling reaction. The mixture was further stirred for 1 hour at a temperature of from 60° to 65° C., followed by filtration and washing with water. The filter-pressed cake thereby obtained was introduced into 250 parts of nitrobenzene and heated to remove water, and then heat-treated at 200° C. for 2 hours. Then, the mixture was cooled and subjected to filtration, followed by washing with methanol, washing with water and drying, whereby 8.0 parts of a red azo-pigment of the formula I where $R_1$ is a 4-chlorophenyl group and $R_2$ is a p-phenylene group was obtained. This pigment had satisfactory properties such as good light-resistance and solvent-resistance.

EXAMPLES 3 TO 45

Various pigments of the present invention, as identified in Table 1, were prepared in the same manner as in Examples 1 and 2, by using the respective starting materials as identified in Table 1.

TABLE 1

| No. | Diazo component | Compound of the formula VI $R_2$ | Color of resulting pigment |
|---|---|---|---|
| 3 | 3-aminophthalimide | 2-chloro-p-phenylene | Yellowish red |
| 4 | " | 2,5-dichloro-p-phenylene | Yellowish red |
| 5 | " | 2-methyl-5-chloro-p-phenylene | Red |
| 6 | " | 2,5-dimethyl-p-phenylene | " |
| 7 | " | 2-methyl-5-methoxy-p-phenylene | " |
| 8 | " | 2,5-dimethoxy-p-phenylene | Bluish red |
| 9 | " | m-phenylene | Red |
| 10 | 4-aminophthalimide | " | " |
| 11 | " | 2-chloro-p-phenylene | " |
| 12 | " | 2,5-dichloro-p-phenylene | Yellowish red |
| 13 | " | 2-methyl-p-phenylene | Red |
| 14 | " | 2-methoxy-p-phenylene | Bluish red |
| 15 | " | 2,5-dimethyl-p-phenylene | Bluish red |
| 16 | " | 2,5-dimethoxy-p-phenylene | Bluish red |
| 17 | N—methyl-3-aminophthalimide | p-phenylene | Red |
| 18 | N—methyl-3-aminophthalimide | " | " |
| 19 | N—methyl-4-aminophthalimide | " | " |
| 20 | N—ethyl-4-aminophthalimide | " | " |
| 21 | N—methyl-4-amino-5-chlorophthalimide | " | " |
| 22 | N—(2-chlorophenyl)-4-aminophthalimide | " | Yellowish red |
| 23 | N—(2,4-dichlorophenyl)-4-aminophthalimide | " | Yellowish red |
| 24 | N—(2,4-dichlorophenyl)-4-aminophthalimide | 2-chloro-p-phenylene | Yellowish red |
| 25 | N—(2,4-dichlorophenyl)-4-aminophthalimide | 2,5-dichloro-p-phenylene | Yellowish red |
| 26 | N—(2,4-dichlorophenyl)-4-aminophthalimide | 2-methyl-p-phenylene | Yellowish red |
| 27 | N—(2,4-dichlorophenyl)-4-aminophthalimide | 2-methoxy-p-phenylene | Red |
| 28 | N—(2,4-dichlorophenyl)-4-aminophthalimide | 2,5-dimethoxy-p-phenylene | " |
| 29 | N—(2,4-dichloro)-4-aminophthalimide | 2,5-dimethoxy-p-phenylene | Bluish red |
| 30 | N—(2,4-dichloro)-4-aminophthalimide | m-phenylene | Red |
| 31 | 3-amino-6-chlorophthalimide | p-phenylene | " |
| 32 | 4-amino-5-chlorophthalimide | " | " |
| 33 | 3-amino-6-methylphthalimide | " | Bluish red |
| 34 | 4-amino-5-methylphthalimide | " | Bluish red |
| 35 | 4-amino-5-methoxyphthalimide | " | Bluish red |
| 36 | N—(4-methylphenyl)-4-aminophthalimide | " | Red |
| 37 | N—(2,4-dichlorophenyl)-4-aminophthalimide | " | Yellowish red |
| 38 | N—(4-chlorophenyl)-3-aminophthalimide | " | Yellowish red |
| 39 | N—(2,4-dichloro)-3-aminophthalimide | " | Yellowish red |
| 40 | N—(2-methyl-4-chloro)4-aminophthalimide | " | Yellowish red |
| 41 | N—phenyl-4-aminophthalimide | " | Red |
| 42 | N—phenyl-3-aminophthalimide | " | " |
| 43 | N—phenyl-4-amino-5-chlorophthalimide | " | " |
| 44 | N—phenyl-3-amino-6-chlorophthalimide | " | " |
| 45 | 3-aminophthalimide | " | Yellowish red |

EXAMPLE 46

3.8 parts of a compound of the formula II where each of $R_1$ and $R_3$ is a hydrogen atom (an azo group being at the 4-position of phthalimide) and 3.8 parts of a compound of the formula III where $R_2$ is a p-phenylene group, were added to 250 parts of o-dichlorobenzene, and reacted for 6 hours at a temperature of from 140° to 145° C. Then, the mixture was cooled and subjected to filtration and washing, whereby 7.0 parts of an azo-pigment having the same structure as the pigment of Example 1 was obtained.

EXAMPLES 47 TO 50

Various azo-pigments as identified in Table 2 were obtained in the same manner as in Example 46 by using the respective starting materials as identified in Table 2.

TABLE 2

| No. | Compound of the formula II | | Compound of the formula III | Color of resulting pigment |
|---|---|---|---|---|
| | $R_1$ | $R_3$ | $R_2$ | |
| 47 | 4-nitrophenyl | Hydrogen | p-phenylene | Brownish red |
| 48 | 2-nitro-4-chlorophenyl | Hydrogen | " | Brownish red |
| 49 | 2-methoxyphenyl | Hydrogen | " | Red |
| 50 | 2-methoxy-5-chlorophenyl | Hydrogen | " | " |

EXAMPLE 51

45.1 parts of a compound having the formula IV where each of $R_1$ and $R_3$ is a hydrogen atom and $R_2$ is a p-phenylene group (an azo group being at the 4-position of phthalimide) and 34.0 parts of a compound of the formula V where Y is $Cl_2$, were added to 900 parts of o-dichlorobenzene and reacted for 3 hours at a temperature of from 120° to 125° C. Then, the mixture was cooled and subjected to filtration and washing, whereby 70 parts of brownish red pigment having the same structure as the pigment of Example 1 was obtained.

EXAMPLE 52

70 parts of a brownish red pigment having the same structure as the pigment of Example 1 was obtained in the same manner as in Example 51 except that 28.4 parts of a compound of the formula V where Y is NH was used instead of the compound of the formula V used in Example 51.

EXAMPLES 53 TO 62

Various pigments as identified in Table 3 were obtained in the same manner as in Examples 51 and 52 by using the respective starting materials as identified in Table 3.

TABLE 3

| No. | Compound of the formula IV | | | Compound of the formula V Y | Color of resulting pigment |
|---|---|---|---|---|---|
| | $R_1$ | $R_2$ | $R_3$ | | |
| 53 | Hydrogen | 2-methyl-m-phenylene | Hydrogen (3-azo) | $Cl_2$ | Red |
| 54 | " | 2-methyl-m-phenylene | Hydrogen (4-azo) | " | " |
| 55 | " | 4-methyl-m-phenylene | Hydrogen (3-azo) | " | " |
| 56 | " | 4-methyl-m-phenylene | Hydrogen (4-azo) | " | " |
| 57 | " | 2-chloro-m-phenylene | Hydrogen (3-azo) | " | Yellowish red |
| 58 | " | 2-chloro-m-phenylene | Hydrogen (4-azo) | " | Yellowish red |
| 59 | " | 5-chloro-m-phenylene | Hydrogen (3-azo) | " | Yellowish red |
| 60 | " | 5-chloro-m-phenylene | Hydrogen (4-azo) | " | Yellowish red |
| 61 | Methyl | 5-chloro-m-phenylene | Hydrogen (3-azo) | NH | Yellowish red |
| 62 | " | 5-chloro-m-phenylene | Hydrogen (4-azo) | " | Yellowish red |

EXAMPLE 63

An aqueous paste of the pigment obtained in Example 1 was added to nitrobenzene, and heated and stirred at 110° C. to distill off water. Then, the mixture was further heated for 3 hours under reflux, and then cooled to 100° C., followed by filtration, washing first with warm nitrobenzene and then with methanol, and drying, whereby a brownish red azo-pigment having a crystalline structure was obtained. The electron microscopic photograph of this pigment is shown in FIG. 2. The X-ray diffraction pattern as measured under the foregoing conditions, was as shown by B in FIG. 5. Namely, the X-ray diffraction pattern shows characteristic peaks at diffraction angles (2θ) of about 9.8°, about 12.4°, about 25.3° and about 26.5°. The properties of this pigment are shown in Table 4.

EXAMPLE 64

45.1 parts of a compound of the formula IV' and 34.0 parts of a compound of the formula V' where Y is $Cl_2$, were added to 900 parts of nitrobenezene, and reacted and heat-treated for 3 hours at a temperature of from 120° to 125° C. The mixture was cooled and subjected to filtration, washing and drying, whereby an azo-pigment of the formula I' was obtained. The electron microscopic photograph, the X-ray diffraction pattern and various properties of this pigment were the same as the pigment of Example 63.

The properties of the pigments of Examples 1 and 63 were evaluated. The results are shown in Table 4.

TABLE 4

| | Example 1 | Example 63 |
|---|---|---|
| Hue (main wavelength nm) | 530,555,660 | 520,550,660 |
| Light-resistance | Fair | Excellent |
| Solvent-resistance | Excellent | Excellent |
| Heat-resistance | Fair | Excellent |

EXAMPLE 65

An aqueous paste of the pigment obtained in Example 1 was added to butyl cellosolve, and heated and stirred at 110° C. to distill off water. Then, the mixture was further heated for 3 hours under reflux. Then, the mixture was cooled to 100° C. and subjected to filtration, followed by washing first with warm nitrobenzene and then with methanol and drying, whereby a brown azo-pigment of the formula I' having a crystalline structure was obtained. An electron microscopic photograph of this pigment is shown in FIG. 3, and the X-ray diffraction pattern as measured under the foregoing conditions is shown by C in FIG. 6. The X-ray diffraction pattern shows characteristic peaks at diffraction angles (2θ) of about 9.7°, about 13.5°, about 24.9° and about 27.0°. The properties of this pigment are shown in Table 5.

EXAMPLE 66

10 parts of the reddish brown azo-pigment obtained in Example 1 was gradually dissolved in 200 parts of 95% sulfuric acid at a temperature of form 10° to 15° C. The solution thereby obtained, was gradually poured into 1000 parts of ice water under stirring. The precipitate formed was collected by filtration and washed with water to obtain a brownish red aqueous cake. This cake was added to 200 parts of ethylene glycol, and the mixture was heated under stirring to distill off water. The mixture was further heated and refluxed for about 3 hours under stirring. The mixture was cooled and subjected to filtration and washing with methanol, whereby a brown azo-pigment of the formula I' having a crystalline structure was obtained. The electron microscopic photograph, the X-ray diffraction pattern and other properties of this pigment were the same as the pigment of Example 1.

The properties of the pigments of Examples 1 and 65 were evaluated. The results are shown in Table 5.

TABLE 5

|  | Example 1 | Example 65 |
|---|---|---|
| Hue (main wavelength nm) | 530,555,660 | 462,660 |
| Light-resistance | Fair | Excellent |
| Solvent-resistance | Excellent | Excellent |
| Heat-resistance | Fair | Excellent |

EXAMPLE 67

An aqueous paste of the pigment obtained in Example 1 was added to α-chloronaphthalene, and heated and stirred at 110° C. to distill off water. Then, the mixture was further heated and refluxed for 3 hours. Then, the mixture was cooled to 100° C. and subjected to filtration, followed by washing first with warm nitrobenzene and then with methanol and drying, whereby a red azo-pigment of the formula I' having a crystalline structure was obtained. An electron microscopic photograph of this pigment is shown in FIG. 4, and the X-ray diffraction pattern as measured under the foregoing conditions is shown by D in FIG. 7. The X-ray diffraction pattern shows characteristic peaks at diffraction angles (2θ) of about 8.6°, about 11.6°, about 12.9°, about 14.3°, about 18.1° and about 26.5°. The properties of the pigment are shown in Table 6.

EXAMPLE 68

10 parts of the reddish brown azo-pigment obtained in Example 1, was gradually dissolved in 200 parts of 95% sulfuric acid at a temperature of from 20° to 25° C. The solution thereby obtained, was gradually poured into 1000 parts of ice water under stirring. The precipitate formed was filtered and washed with water, whereby a brownish red water cake was obtained. The cake was added to 200 parts of trichlorobenzene. Further, 0.1 part of the azo-pigment obtained in Example 67 was added as crystal seeds, and the mixture was stirred at a temperature around 110° C. to distill off water. The heating was continued and the mixture was refluxed for about 3 hours under stirring. Then, the mixture was cooled and subjected to filtration, followed by washing first with trichlorobenzene and then with methanol, whereby a red azo-pigment of the formula I' having a crystalline structure was obtained. The electron microscopic photograph, the X-ray diffraction pattern and other properties of the pigment were the same as the pigment of Example 67.

The properties of the pigments of Examples 1 and 67, were evaluated. The results obtained are shown in Table 6.

TABLE 6

|  | Example 1 | Example 67 |
|---|---|---|
| Hue (main wavelength nm) | 530,555,660 | 546 |
| Light-resistance | Fair | Excellent |
| Solvent-resistance | Excellent | Excellent |
| Heat-resistance | Fair | Excellent |

We claim:

1. An azo pigment represented by the formula:

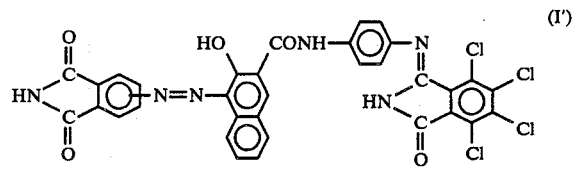

2. The azo-pigment of the formula I' according to claim 1, which hac a crystalline structure showing characteristic X-ray diffraction peaks at diffraction angles (2θ) of about 9.80°, about 12.4°, about 25.3° and about 26.5°.

3. The azo-pigment of the formula I' according to claim 1, which has a crystalline structure showing characteristic X-ray diffraction peaks at diffraction angles (2θ) of about 9.7°, about 13.5°, about 24.9° and about 27.0°.

4. The azo-pigment of the formula I' according to claim 1, which has a crystalline structure showing characteristic X-ray diffraction peaks at diffraction angles (2θ) of about 8.6°, about 11.6°, about 12.9°, about 14.3°, about 18.1°, and about 26.5°.

* * * * *